United States Patent Office 2,881,376
Patented Apr. 7, 1959

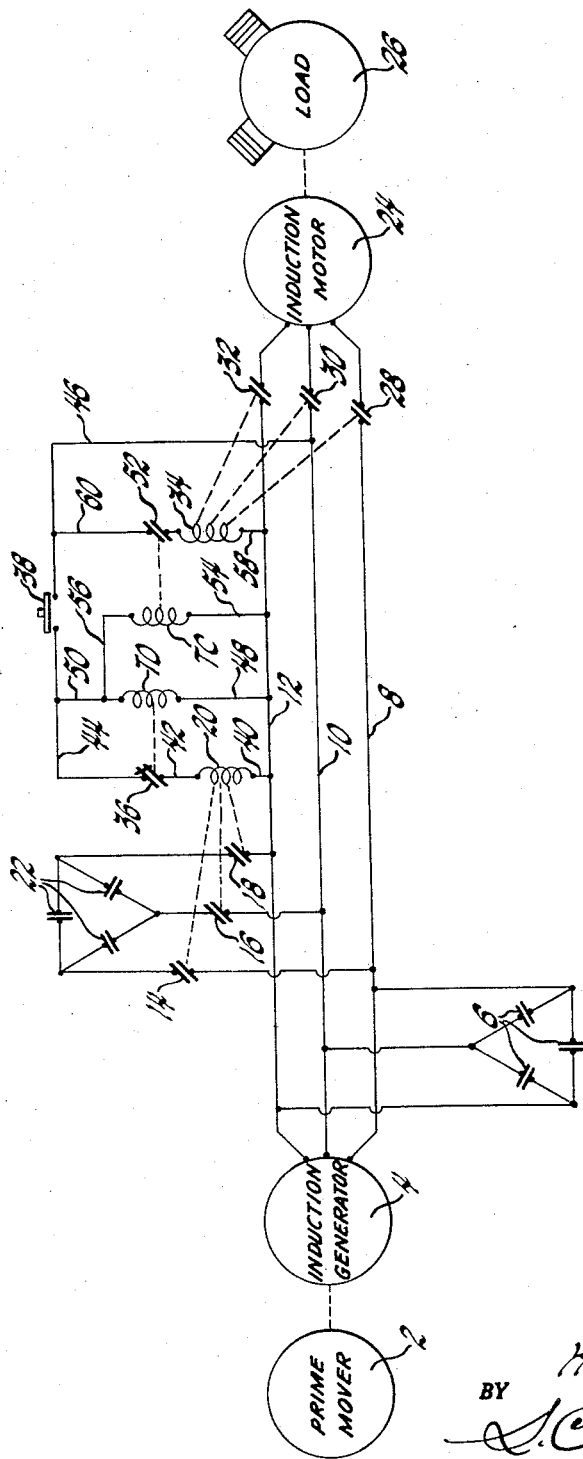

2,881,376

INDUCTION MOTOR CONTROL SYSTEM

Henry V. Shaw, Detroit, Mich., assignor to General Motors Corporation, Detroit, Mich., a corporation of Delaware Application June 21, 1956, Serial No. 592,830

5 Claims. (Cl. 318—148)

This invention relates generally to power control systems and particularly to electrical power control systems utilizing a self-excited induction generator and an induction motor which is permanently coupled to a load.

The use of self-excited induction generators as a means of power generation has been restricted in the past primarily because of the size and cost of the capacitors required for exciting such generators. There are, however, certain applications in which a self-excited induction generator becomes extremely desirable because of the inherent advantages in the construction of this type of generator. These generators which are of squirrel-cage design are usually rugged and require very little maintenance. They do not need voltage regulators, exciters or the associated brushes, commutators or slip rings which are a necessary part of conventional synchronous alternators.

It has been found that almost any type of load can be handled with a suitable self-excited induction generator as long as the prime mover is of sufficient size to handle the maximum load. An essential feature of such generators, however, is that there be sufficient capacitive kvar (reactive kilovolt amperes) to keep the generator voltage high enough to start an induction motor coupled to a load. As is well known, high currents are momentarily required to start an induction motor under load. Although these currents may be drawn at a relatively low lagging power factor this is a severe shock load for any type of alternating current power generator unless its rating is several times the full load rating of the motor. If a synchronous alternator were used the exciter and regulator must keep the voltage high enough to carry the overload. With a self-excited induction generator the capacitive kvar (reactive kilovolt amperes) must be sufficient to supply excitation for the generator to keep up its voltage and also the lagging reactive kilovolt amperes of the overload otherwise the self-excited induction generator voltage may drop to a point where it is incapable of supplying sufficient current to start the motor.

It is for this latter reason that the present invention proposes to connect additional capacitors to the induction generator during the period when the induction motor is first connected to the induction generator and to later disconnect these additional capacitors after the running speed of the induction motor with the load permanently coupled thereto is reached. The reason for disconnecting these additional capacitors is that if these capacitors are left connected across the generator after the induction motor comes up to speed high line voltage and low leading power factor may result.

To state the problem more simply, when a self-excited induction motor is connected across an induction generator and the induction motor is permanently connected to a load extremely high currents are demanded by the induction motor which tend to drop the voltage of the induction generator and if this voltage drop is too great the current supplied to the motor will be insufficient to start it. The purpose, then, of adding additional capacitance across the generator during starting of the motor is to build up or help maintain the voltage of the induction generator. Supplementing the induction generator excitation by adding capacitance or capacitive reactance across the generator produces a result similar to "field forcing." During the development of the present invention, however, it was discovered that line voltage was maintained more effectively if this additional capacitance was connected across the generator momentarily ahead of applying the load to the generator. As a result, a unique induction motor starting arrangement has been developed which forms a primary part of the subject matter of this invention. This starting arrangement automatically delays the connection of the induction motor to the induction generator until added capacitance has first been connected across the generator to allow generator voltage to build up after which this novel time delay and switching means connects the induction motor across the induction generator, allows the motor to come up to speed and then disconnects this added capacitance from across the generator.

For a fuller understanding of the details of this invention and how the objects thereof are accomplished, reference is made to the single drawing which is a schematic diagram of one form of the invention.

In the drawing a prime mover is so labeled and further indicated by a numeral 2. The prime mover is coupled so as to drive an induction generator also so labeled and further indicated by a numeral 4. The induction generator 4 is typical of such generators in that it is a three-phase squirrel-cage induction motor acting as a self-excited induction generator by being directly driven by prime mover 2 and excited by means of standard power factor correcting capacitors 6 in shunt across the output terminals of the generator.

As already mentioned, the induction generator 4 is a three-phase machine having output terminals connected to transmission lines 8, 10 and 12. Connected in delta to transmission lines 8, 10 and 12 via the normally open contacts 14, 16 and 18 of a relay 20 are additional standard power factor correcting capacitors 22 also across the output terminals of the generator. An induction motor, so labeled and also indicated by a numeral 24, is coupled to a load 26 diagrammatically shown as a compressor such as might be used for refrigeration, etc. The induction motor 24 which is also three-phase is adapted to have its input terminals connected to the transmission lines 8, 10 and 12 by normally open contacts 28, 30, and 32 of a relay 34. The operating coil of relay 20 is connected in series with a pair of normally closed contacts 36 of a relay TO and a normally open manual switch 38 across one phase of the induction generator between the transmission lines 12 and 10. This circuit includes, beginning with transmission line 12, a wire 40, operating coil of relay 20, wire 42, normally closed contacts 36, wire 44, switch 38, and wire 46 leading to transmission line 10. The relay TO is of the time-delay type which when connected across a suitable voltage source delays activation so as to maintain the normally closed contacts 36 closed a predetermined interval after energization. This relay TO is also connected across one phase of the induction generator beginning with transmission line 12 and including a wire 48, energizing coil of relay TO, wire 50, wire 44, switch 38 and wire 46 leading to transmission line 10. A fourth relay TC is provided with an energizing coil whose characteristic is such that the normally open contacts 52 of relay TC remain open a predetermined interval of time after energization of the coil of relay TC. Relay TC is likewise connected across one phase of the induction generator by closure of switch 38. This circuit includes, beginning with transmission line 12, a wire 54, the operating coil of relay TC, a wire 56, wire 50, switch 38 and wire 46. Closure of the contacts 52 of the TC relay connects the operating coil of relay 34 across one phase of the induction generator. This circuit includes, beginning with transmission line 12, a wire 58, the operating coil of relay 34, normally open contacts 52 of the TC relay, a wire 60 and wire 46.

The operation of the system is as follows: Assuming the prime mover and induction generator to be turning at rated speed with the induction motor and the load coupled thereto disconnected from the generator, the voltage of the generator will be built up to a certain magnitude which is determined by the capacitive reactance of capacitors 6. Now, if it is desired to connect the induction motor 24 and the compressor load 26 to the induction generator, the switch 38 will be closed. (Although switch 38 is shown as a manually operated switch, it will be appreciated that this switch could be closed automatically in response to, for example, temperature or other conditions which might call for operation of the compressor or other types of loads.) Closure of switch 38, as indicated by the previously traced out circuits, connects the operating coils of relay 20, relay TO and relay TC across one phase of the induction generator. Energization of relay 20 immediately causes the normally open contacts 14, 16 and 18 to close thereby connecting additional capacitive reactance 22 across the induction generator to thereby increase the excitation and consequently the voltage thereof. After a predetermined interval of time the second step in the sequence of events is for the normally open contacts 52 of the TC relay to close. Closure of the contacts 52 connects the operating coil of relay 34 across a phase of the induction generator so as to energize this relay and cause closure of its normally open contacts 28, 30 and 32. Closure of contacts 28, 30 and 32 immediately connects the induction motor 24 to the induction generator 4. Because the voltage of the induction generator has had a chance to build up due to the addition of the capacitive reactance across the induction generator and the delay in connecting the induction motor across the generator, the speed of the induction motor with the load coupled thereto increases smoothly and positively up to rated speed. When the induction motor reaches rated speed the relay TO which was energized by closure of switch 38 but which due to its characteristic retained its normally closed contacts 36 closed, now opens its contacts 36 thereby de-energizing the operating coil of relay 20. De-energization of relay 20 causes its interlocks 14, 16 and 18 to open to disconnect the capacitive reactance 22 from across the induction generator since it is no longer needed and, in fact, is best removed because the voltage would otherwise be built up too high and also low leading power factor might result.

From the foregoing description it may now be appreciated that a new power control system has been provided which includes a novel manner of starting an induction motor coupled to a load and whose power is supplied by a self-excited induction generator.

I claim:

1. In a power system including a capacitor-excited induction generator, an induction motor adapted to be electrically connected to said generator, and automatic control means operable to in sequence automatically first increase the exciting capacitance of said generator, second connect said motor to said generator, and third reduce said capacitance.

2. In a power system including a capacitor-excited induction generator, an induction motor having a load coupled thereto and adapted to be electrically connected to said generator, and automatic control means operable to automatically sequentially increase the exciting capacitance of said generator, connect said motor to said generator, and reduce said capacitance after said motor comes up to rated speed.

3. In combination with a prime-mover-driven induction generator and an induction motor having a load coupled thereto, starting means for connecting said motor to said induction generator comprising manually operated switching and automatic control means operable upon actuation to automatically sequentially increase the exciting capacitance of said induction generator, connect said induction motor across said induction generator, and after said induction motor with the load coupled thereto has reached a predetermined speed decrease the exciting capacitance of said induction generator.

4. In combination with a prime-mover-driven capacitor-excited induction generator and an induction motor having a load coupled thereto, means for starting said induction motor by connecting it to said induction generator comprising additional capacitance adapted to be connected across said generator, switching means including a switch, a first relay having an operating coil connected across said induction generator by operation of said switch and having normally open contacts between said additional capacitance and said generator, a second relay having a time-delay opening characteristic and a pair of normally closed contacts in series with the operating coil of said first relay and whose operating coil is connected across said induction generator by closure of said switch, a third relay having normally open contacts between said induction generator and said induction motor for connecting said induction motor to said induction generator, a fourth relay having a time-delay closing characteristic and including a pair of normally open contacts in series with the operating coil of said third relay across said induction generator and whose operating coil is connected across said generator by closure of said switch, the time-delay characteristics of said second and fourth relays being such that said second relay remains de-activated after energization longer than said fourth relay, the time-delay closing characteristic of said fourth relay and the time-delay opening characteristic of said second relay being such that upon closure of said switch to energize said first, second, and fourth relays, said additional capacitance is connected across said generator to increase the voltage thereof prior to energization of said third relay to connect said induction motor across said generator, the time-delay opening characteristic of said second relay being such that upon closure of said switch disconnecting of said added capacitance occurs after connection of said motor to said generator for a predetermined interval of time.

5. In a power system including a capacitor-excited induction generator, an induction motor adapted to be electrically connected to said generator, and automatic control means operable to in sequence automatically first increase the exciting capacitance of said generator and second connect said motor to said generator comprising external exciting capacitance and relay means having switching contacts which when said relay means is energized immediately connect said external capacitance across said generator, said relay means having additional switching contacts in series with said generator and motor which when said relay means is energized are delayed in closing so that said motor is connected to said generator after said additional capacitance has been connected thereto.

References Cited in the file of this patent

FOREIGN PATENTS 651,029    Great Britain  ------------ Mar. 7, 1951